United States Patent
Abou-Akar et al.

(10) Patent No.: US 7,388,310 B2
(45) Date of Patent: Jun. 17, 2008

(54) SYNCHRONOUS ELECTRICAL MACHINE COMPRISING A STATOR AND AT LEAST ONE ROTOR, AND ASSOCIATED CONTROL DEVICE

(75) Inventors: Atef Abou-Akar, Lille d'Espagnac (FR); Jacques Saint-Michel, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 122 days.

(21) Appl. No.: 10/547,194

(22) PCT Filed: Mar. 29, 2004

(86) PCT No.: PCT/FR2004/000787

§ 371 (c)(1),
(2), (4) Date: Nov. 2, 2005

(87) PCT Pub. No.: WO2004/091075

PCT Pub. Date: Oct. 21, 2004

(65) Prior Publication Data

US 2006/0097594 A1 May 11, 2006

(30) Foreign Application Priority Data

Mar. 31, 2003 (FR) .................................. 03 03980

(51) Int. Cl.
*H02K 1/27* (2006.01)

(52) U.S. Cl. .......................... 310/156.48; 310/156.55; 310/156.56

(58) Field of Classification Search ........... 310/156.48, 310/156.49, 156.55, 156.56, 216, 261, 162
See application file for complete search history.

(56) References Cited

U.S. PATENT DOCUMENTS

| | | | | |
|---|---|---|---|---|
| 3,979,821 A * | 9/1976 | Noodleman | .................. | 29/598 |
| 4,339,874 A * | 7/1982 | Mc'Carty et al. | ............. | 29/598 |
| 4,459,500 A * | 7/1984 | Miyamoto | ............. | 310/154.21 |
| 5,015,903 A * | 5/1991 | Hancock et al. | ............ | 310/168 |
| 5,091,668 A * | 2/1992 | Cuenot et al. | ......... | 310/156.61 |
| 5,162,686 A * | 11/1992 | Royer | ................... | 310/156.59 |
| 5,642,013 A * | 6/1997 | Wavre | ........................ | 310/254 |
| 6,144,132 A * | 11/2000 | Nashiki | ................. | 310/156.55 |
| 6,265,804 B1 * | 7/2001 | Nitta et al. | ................. | 310/259 |
| 6,335,582 B1 * | 1/2002 | Abukawa et al. | ........... | 310/214 |
| 6,661,137 B2 * | 12/2003 | Gauthier | ................... | 310/75 R |
| 6,700,288 B2 * | 3/2004 | Smith | ........................ | 310/218 |
| 6,724,114 B2 * | 4/2004 | Horst | .................... | 310/154.11 |

(Continued)

FOREIGN PATENT DOCUMENTS

DE         30 16 540 A1        11/1981

(Continued)

OTHER PUBLICATIONS

Bianchi et al.; "Salient-Rotor PM Synchronous Motors for an Extended Flux-Weakening Operation Range"; XP-001099914; Jul./Aug. 2000 IEEE Transactions on Industry Application; vol. 36, No. 4; pp. 1118-1125; Jul./Aug. 2000.

*Primary Examiner*—Tran Nguyen
(74) *Attorney, Agent, or Firm*—Oliff & Berridge, PLC

(57) ABSTRACT

The invention relates to a synchronous electric motor comprising a stator (10) and at least one rotor (20) with permanent magnets (21), characterized by an embodiment with $X_d > X_q$; where $X_d$ is the direct reactance and $X_q$ the quadrature reactance.

19 Claims, 2 Drawing Sheets

U.S. PATENT DOCUMENTS 6,727,618 B1 * 4/2004 Morrison .................. 310/90.5
2002/0175583 A1 11/2002 Kikuchi et al.

FOREIGN PATENT DOCUMENTS

| | | |
|---|---|---|
| DE | 197 23 302 A1 | 12/1998 |
| EP | 1 164 684 A2 | 12/2001 |
| JP | A 58-151858 | 9/1983 |
| WO | WO 2004/070918 A1 | 8/2004 |

* cited by examiner

SYNCHRONOUS ELECTRICAL MACHINE COMPRISING A STATOR AND AT LEAST ONE ROTOR, AND ASSOCIATED CONTROL DEVICE

The present invention relates to the field of rotating electrical machines.

The invention relates more particularly, but not exclusively, to permanent-magnet synchronous machines, able to operate at substantially constant power over a large speed range, for example to lifting machines or electrical traction machines.

Within the context of lifting, it is useful to match the lifting speed to the load being lifted, so as to reduce the lifting time when this load is small, while still being able to lift heavier articles.

Within the context of electrical traction, at startup or when the vehicle comes to a rise, the motor must deliver a high torque at low speed. In contrast, on a horizontal path, the loads to be delivered are less and the vehicle can run more quickly without requiring more power from the motor.

Synchronous machines can operate at constant torque up to a certain speed, called the base speed. Up to this base speed, the power increases approximately proportionally to the rotation speed of the rotor. Above the base speed, the torque decreases at approximately constant power.

The armature phases may be modeled, each by an inductance that groups together the terms: self-induction, mutual induction between phases and leakage induction. This inductance depends on the angular position of the rotor relative to the stator and it has, as components in a reference frame tied to the electrical angular frequency, the direct inductance $L_d$ and the quadrature inductance $L_q$. The direct reactance $X_d$ denotes the product of the direct inductance $L_d$ multiplied by the electrical angular frequency $\omega$ and the quadrature reactance $X_q$ denotes the product of the quadrature inductance $L_q$ multiplied by the electrical angular frequency $\omega$. The rotation speed $\Omega$ of the rotor is related to the electrical angular frequency $\omega$ through the relationship $\omega = z\Omega$, where z denotes the number of pairs of poles.

In the reference frame tied to the electrical angular frequency, the direct inductance $L_d$ of a phase of the armature is the value of the inductance on the d axis, called the direct axis, that is to say when the axis of the armature poles coincides with that of the stator coils of this same phase. The quadrature inductance $L_q$ is the value of the inductance on the q axis, called the quadrature axis, that is to say when the axis of the inductor poles is perpendicular to the axis of the stator coils for this same phase.

Known permanent-magnet rotating electrical machines for lifting and for electrical traction are predominantly machines called "smooth pole" machines, for which the direct reactance $X_d$ is approximately equal to the quadrature reactance $X_q$.

In addition to smooth pole machines, there are also machines called "inverted salient pole" machines, for which the direct reactance $X_d$ is substantially less than the quadrature reactance $X_q$. Their main advantage is that the reluctance torque, which is proportional to the difference between the reactances $X_q$ and $X_d$, is added, in normal operation, to the electromotive force torque generated by the magnets. This makes it possible, for the same demanded torque, to reduce the volume of the magnets and therefore the cost of the machine. For this type of machine, there is an optimum phase lead of the current relative to the electromotive force, for which the torque is a maximum. It is this operating point that is retained up to the base speed.

Above the base speed, the voltage across the phase terminals of the machine becomes, all other things being equal, greater than the available voltage supplied by the mains to the machine via the control device, because of the electromotive force that varies proportionally with the speed.

To reduce the voltage across the phase terminals of the machine, the current in the stator windings and its phase difference relative to the armature flux, that is to say that of the magnets, are varied in order to create a magnetic flux that partly opposes the armature flux. This operation is called "defluxing" and generates electrical losses that are greater the higher the current needed for defluxing.

There is a need to improve synchronous machines and to allow them to operate with a high efficiency at substantially constant power over a wide speed range, and especially above the base speed.

The invention satisfies this need thanks to a synchronous electrical machine comprising a stator and at least one rotor having permanent magnets, the machine being characterized in that it is designed so as to have $X_d > X_q$, where $x_d$ is the direct reactance and $X_q$ is the quadrature reactance. For example, $X_d/X_q > 1.1$ and better still $X_d/X_q > 1.5$. For example, it is possible to have $X_d/X_q \simeq 3$.

The advantages afforded by the invention are given below.

Firstly, if the power factor cos Φ varies inversely with the quadrature reactance $X_q$, a low $X_q$ value allows a high power factor to be obtained. For example, depending on the desired power factor level, $X_q I_o/E$ lies between 0.33 and 0.6, where $I_o$ denotes the maximum line current intensity imposed by the rating of the controller and E denotes the electromotive force induced per phase of the machine.

Secondly, since the flux of the magnets is oriented along the direct axis d, the defluxing is achieved by injecting a current into the armature so as to generate, along the direct axis d, a flux proportional to the direct reactance $X_d$ and to the component $I_d$ of the current along the direct axis. With a high direct reactance $X_d$, substantial defluxing is obtained with a lower direct current $I_d$ and therefore lower corresponding losses. This consequently reduces the rating of the control device and improves the efficiency.

In addition, in the event of a short circuit, a high $X_d$ reduces the risk of demagnetization, which depends on the value of the short-circuit current. This current is proportional to the ratio of the electromotive force to the direct reactance, and it is therefore low when the direct reactance $X_d$ is large. For example, over the defluxing range required, $X_d I_o/E$ lies between 0.66 and 1, where $I_o$ denotes the maximum line current intensity imposed by the rating of the controller and E is the electromotive force induced per phase of the machine.

Up to the base speed, the machine can operate with a current in phase with the electromotive force. The electromotive force torque is a maximum and the reluctance torque is zero. The base speed may for example be greater than 100 or 200 revolutions per minute.

In one particular embodiment, the stator has teeth, each carrying at least one individual coil, and these teeth are devoid of pole shoes. This makes it possible in particular to install prefabricated coils on the teeth, thereby simplifying the manufacture of the machine.

The rotor is advantageously a flux-concentrating rotor, the permanent magnets of the rotor then being placed between pole pieces. This makes it possible to reduce the number of magnets, and therefore to reduce the cost of the machine.

The direct and quadrature reactance values may be determined by the shape of the rotor pole pieces, and especially by the shape of the salient parts of these pole pieces.

The salient parts of two successive pole pieces may define, between them, a notch that has two opposed edges, including radial portions, and a bottom partly formed by one face of at least one permanent magnet.

Such a pole piece shape introduces a dissymmetry between the direct and quadrature reactances and a relatively large positive difference between the direct and quadrature reactances.

The rotor pole pieces may each have a face turned toward the stator, which face has a convex portion. The convex portion of a pole piece may have a radius of curvature of between 20% and 30% of a radius of the stator, especially the inside radius of the stator, or even about 25% thereof.

The circumferential ends of this convex portion may be angularly offset relative to the permanent magnets that are adjacent this pole piece. The angular offset of the circumferential ends relative to the adjacent permanent magnets may lie:

between $80°/n_{teeth}$ and $100°/n_{teeth}$, being for example about $90°/n_{teeth}$, for a machine in which the ratio of the number of stator teeth $n_{teeth}$ to the number of rotor poles $n_{poles}$ is 3/2 or which satisfies the relationship $n_{teeth}/n_{poles}=6n/(6n-2)$, where n is an integer greater than or equal to 2; and between $50°/n_{teeth}$ and $70°/n_{teeth}$, being for example about $60°/n_{teeth}$, for a machine that satisfies the relationship $n_{teeth}/n_{poles}=6n/(6n+2)$, where n is an integer greater than or equal to 2.

Each of the permanent magnets of the rotor may lie radially set back from the circumferential ends of the convex portions of the two adjacent pole pieces. The setback in the radial direction of the magnets relative to the circumferential ends of the convex portions may lie between 10% and 20%, for example being about 15%, of a radius of the stator, especially the inside radius of the stator.

Each of the pole pieces of the rotor may have two shoulders. A permanent magnet may lie between the shoulders of two adjacent pole pieces.

Each of the pole pieces of the rotor may have a salient part extending toward the stator, having radial edges that are angularly offset relative to radially directed edges of the permanent magnets adjacent this pole piece.

The permanent magnets of the rotor may have, when the machine is observed along the rotation axis of the rotor, a cross section of elongate shape in a radial direction. In particular, the permanent magnets of the rotor may have, when the machine is observed along the rotation axis of the rotor, a rectangular cross section with its large side oriented parallel to a radius of the machine.

In one particular embodiment of the invention, the $X_d/X_q$ ratio is chosen so as to obtain, at the maximum rotation speed of the rotor, substantially the same power as that obtained at the base speed, with the same voltage and the same current.

It is preferable to choose, from among the possible values of the $X_d/X_q$ ratio for obtaining the abovementioned result, the smallest one in order to avoid having a high salience, which would result in poles of smaller opening and a larger equivalent gap, and which would consequently increase the volume of the magnets, and therefore the cost and the weight of the machine. A high salience would furthermore reduce the maximum torque that the machine would be able to deliver, which would limit the overload possibilities.

The stator may have 6n teeth and the rotor may have 6n±2 poles, n being greater than or equal to 2. Such a structure allows both the torque ripple and the voltage harmonics to be reduced.

The machine may have a single inner rotor or, as a variant, an inner rotor and an outer rotor that are placed radially on either side of the stator and are rotationally coupled. By using a double rotor, it is possible to reduce the iron losses.

The machine may constitute a generator or a motor.

The power of the machine may be equal to or greater than 0.5 kW, for example being around 1.5 kW, although this value is in no way limiting.

The subject of the invention is also, independently of or in combination with the foregoing, an electrical machine comprising:

at least one stator; and at least one rotor, the rotor having pole pieces and permanent magnets that are placed between the pole pieces, and each pole piece having a salient part and, on either side of this salient part, a shoulder.

The shoulders of two adjacent pole pieces may be flush with the permanent magnet placed between them.

Each salient part may be bounded in the circumferential direction by an edge running radially.

It is possible for each pole piece not to cover the adjacent permanent magnets in the circumferential direction.

Each salient part may be radially bounded by a continuously rounded edge.

Each pole piece may be symmetrical relative to a midplane lying radially.

Each pole piece may comprise a stack of magnetic laminations.

The salient part may have a radially external circular edge, the center of curvature of which is different from the center of rotation, the center of curvature for example lying on a radius between the center of rotation and the maximum half-diameter of the rotor.

The angular separation between two adjacent salient parts may be greater than the angular width of the permanent magnet placed between the corresponding pole pieces.

The permanent magnets may have an outer face turned toward the stator.

The subject of the invention is also a control device for controlling a machine as defined above.

The subject of the invention is also, independently of or in combination with the foregoing, a control device for controlling a synchronous motor, allowing the motor to operate at approximately constant power $P_o$ over a range of rotation speeds of the rotor, which includes a computer designed to determine the direct current component $I_d$ and the quadrature current component $I_q$ of the motor supply current, the current components $I_d$ and $I_q$ being equal, to within 20%, better still to within 10% and even better to within 5%, to:

$$I_d = i_d I_o \approx -i \sin\alpha I_o \text{ and } I_q = i_q I_o \approx i \cos\alpha I_o,$$

where $I_o$ is the maximum intensity of the current imposed by the rating of the control device;

$$\alpha = \arctan\left(\frac{x_q(e-y)}{x_d x}\right); i = \sqrt{\left(\frac{x}{x_q}\right)^2 + \left(\frac{e-y}{x_d}\right)^2},$$

the unitary current flowing in one phase of the armature; (x,y) being one of the real roots of the equations:

$$x^2 + y^2 = \frac{v^2}{m^2} \text{ and } y = e\left(1 - \frac{x_d}{x_d - x_q}\right) + \frac{p}{m} e \frac{x_d x_q}{x_d - x_q} \frac{1}{x};$$

m denotes the ratio of the rotation speed of the rotor to the base speed;

e is the ratio of, on the one hand, the electromotive force and, on the other hand, the product of m multiplied by the voltage $V_o$ imposed by the mains supply;

v is the ratio of the voltage across the terminals of one phase of the armature to the voltage $V_o$ imposed by the mains supply;

p is the ratio of the rms power to the constant power $P_o$ at which it is desired to operate the machine; and α is the phase difference between the current and the electromotive force.

The terms "direct current component" and "quadrature current component" are understood to mean the current intensities projected onto the direct axes d and the quadrature axes q of the reference frame tied to the electrical angular frequency.

In the above, $X_d$ denotes the quotient $$\frac{X_d I_o}{m V_o},$$

$X_d$ being the direct reactance.
Likewise, $$= \frac{X_q I_o}{m V_o},$$

where $X_q$ is the quadrature reactance.

Such a control device shifts the current through an angle α relative to the electromotive force, while keeping the voltage constant, and the component $i_d$ of i on the direct axis d will create a flux that opposes the main flux. The magnetomotive force is therefore reduced, consequently resulting in a drop in the overall induced voltage.

The unitary value i of the current may only be increased above its nominal value for reasons associated with the heat-up of the machine and with the rating of the control device.

The desired voltage may be obtained with the minimum shift α, that is to say the lowest unitary direct intensity $i_d$, so as to have a higher quadrature current, which helps to create the torque.

The defluxing ratio is the maximum value of m for obtaining the same power $P_o$ as that obtained at the base speed with the same voltage $V_o$ and the same current $I_o$ defined above. From these may be deduced the values of the electromotive force and the values of the direct and quadrature reactances for a given machine. The $X_d/X_q$ ratio thus obtained for given $P_o$, $V_o$ and $I_o$ is an increasing function of the desired defluxing ratio, the latter possibly being, for example, greater than 2, for example equal to 6.

Among the possible solutions (x,y), it is preferred to choose that which minimizes i.

The control device described above is preferably used in combination with a synchronous motor having $X_d > X_q$, as defined above.

The control device may furthermore include:

a three-phase inverter; and a vector controller designed to transmit, according to the current components $i_d$ and $i_q$, the control signals to electronic switches of the inverter.

The subject of the invention is also, independently of or in combination with the foregoing, a method of controlling a motor in which at least the supply voltage of an inverter connected to the motor and the rotation speed of the motor are measured, and the direct current component $i_d$ and quadrature current component $i_q$ of the supply current for maintaining constant power for a given speed setpoint Ω* above the base speed are determined by real-time calculation and/or by access to a register.

A torque setpoint t* may be determined as a function of at least the difference between the measured rotation speed and the rotation speed setpoint Ω* of the rotor. A power setpoint may be determined as a function of at least the torque setpoint and the measured rotation speed. The unitary direct current component $i_d$ and quadrature current component $i_q$ values may be calculated in real time from the power setpoint, the measured rotation speed and the DC supply voltage of the inverter. The direct and quadrature current components may be determined according to the control laws as a function of the load and the supply voltage of the inverter. These control laws may be integrated into the computer so as to improve its dynamic performance.

The subject of the present invention is also, independently of or in combination with the foregoing, an electric vehicle having a motor comprising:

a stator; and at least one rotor having permanent magnets, the motor being designed so as to have $X_d > X_q$, where $X_d$ is the direct reactance and $X_q$ is the quadrature reactance.

The vehicle may also include a control device for controlling a synchronous motor, allowing the motor to operate at approximately constant power over a range of rotation speeds of the rotor, which includes a computer designed to determine the direct current component $I_d$ and the quadrature current components $I_q$ of the motor supply current, which are injected into the motor, the current components $I_d$ and $I_q$ being equal, to within 20%, better still to within 10% and even better to within 5%, to:

$$I_d \approx i_d I_o \approx -\sin\alpha I_o \text{ and } I_q \approx i_q I_o \approx i\cos\alpha I_o,$$

where $I_o$ is the maximum intensity of the current imposed by the rating of the control device;

$$\alpha = \arctan\left(\frac{x_q(e-y)}{x_d x}\right); i = \sqrt{\left(\frac{x}{x_q}\right)^2 + \left(\frac{e-y}{x_d}\right)^2},$$

the unitary current flowing in one phase of the armature; (x,y) being one of the real roots of the equations:

$$x^2 + y^2 = \frac{v^2}{m^2} \text{ and } y = e\left(1 - \frac{x_d}{x_d - x_q}\right) + \frac{p}{m} e \frac{x_d x_q}{x_d - x_q} \frac{1}{x};$$

m denotes the ratio of the rotation speed of the rotor to the base speed;

e is the ratio of, on the one hand, the electromotive force and, on the other hand, the product of m multiplied by the maximum voltage per phase $V_o$ imposed by the mains supply;

v is the ratio of the voltage across the terminals of one phase of the armature to the voltage $V_o$ imposed by the mains supply;

p is the ratio of the rms power to the constant power at which it is desired to operate the machine; and;

α is the phase difference between the current and the electromotive force.

The present invention will be better understood on reading the following detailed description of a nonlimiting illustrative example of the invention and on examining the appended drawing in which.

ELECTRICAL MACHINE

Figure 1:
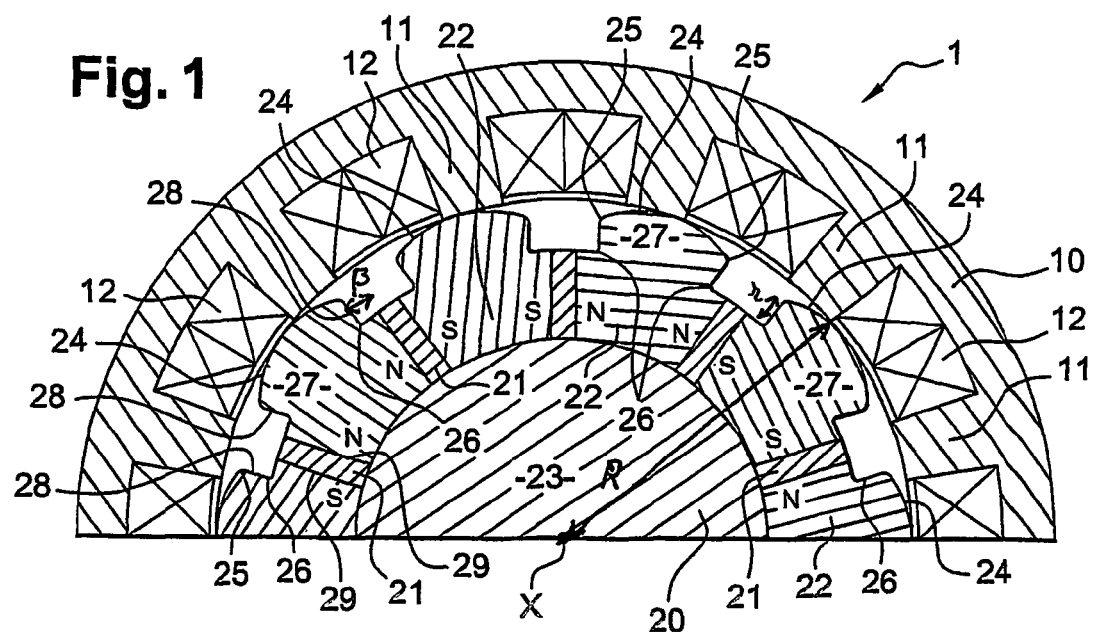
FIG. 1 shows a schematic partial view, in cross section, of a machine according to the invention.

FIG. 1 shows a synchronous electrical machine 1 comprising a stator 10 and a rotor 20 having permanent magnets 21.

The stator 10 has teeth 11, each carrying an individual coil 12, the coils 12 being electrically connected together so as to be supplied by a three-phase current.

The rotor 20 is a flux-concentrating rotor, the permanent magnets 21 being placed between pole pieces 22. The permanent magnets 21 and the pole pieces 22 are appropriately fastened to a shaft 23 of the machine.

The pole pieces 22 may be held in place on the shaft 23 by bonding, or else by producing complementary shapes on the shaft and on the pole pieces, or else they can be held in place by rods engaged in the pole pieces 22 and fastened at their ends to flanges of the rotor.

The pole pieces 22 are produced by a stack of magnetic laminations, each coated with an insulating varnish, so as to limit the induced current losses.

The magnets 21 have polarities of like type, these being directed toward the pole piece 22 placed between them, as may be seen in FIG. 1.

The pole pieces 22 each have a salient part 27 and their face turned toward the stator 10 has a convex portion 24. The convex portion 24 of a pole piece 22 may have a radius of curvature of between 20% and 30% of a radius of the stator, especially the inside radius of the stator, or even about 25% thereof.

Each convex portion 24 has circumferential ends 25 angularly offset relative to the adjacent permanent magnets 21. The angular offset β of the circumferential ends 25 relative to the adjacent permanent magnets 21 may lie:

between $80°/n_{teeth}$ and $100°/n_{teeth}$, being for example about $90°/n_{teeth}$, for a machine in which the ratio of the number of stator teeth $n_{teeth}$ to the number of rotor poles $n_{poles}$ is 3/2 or which satisfies the relationship $n_{teeth}/n_{poles} = 6n/(6n-2)$, where n is an integer greater than or equal to 2, for example equal to 2 or 3; and between $50°/n_{teeth}$ and $70°/n_{teeth}$, being for example about $60°/n_{teeth}$, for a machine that satisfies the relationship $n_{teeth}/n_{poles} = 6n/(6n+2)$, where n is an integer greater than or equal to 2, for example equal to 2 or 3.

In these equations, $n_{teeth}$ denotes the number of stator teeth 11 and $n_{poles}$ denotes the number of pole pieces 27.

The permanent magnets 21 lie radially set back from the circumferential ends 25 of the convex portions 24. The setback r in the radial direction of the magnets 21 relative to the circumferential ends 25 of the convex portions 24 may lie between 10% and 20%, or even about 15%, of the inside radius R of the stator.

Each pole piece 22 furthermore has two shoulders 26 lying on either side of the salient part 27, each permanent magnet 21 lying between two shoulders 26.

The salient parts 27 of each of the rotor pole pieces 22 have radial edges 28 which, just like the circumferential ends 25, are angularly offset relative to the radially directed faces 29 of the adjacent permanent magnets 21.

The permanent magnets 21 have, when the machine is observed along the rotation axis X, a cross section of elongate shape in a radial direction. This cross section is, in the example described, rectangular, with its large side oriented parallel to a radius of the machine. As a variant, the permanent magnets could each have a wedge shape.

In the example in question, the rotor has ten poles and the stator twelve teeth, the stator thus having 6n teeth and the rotor 6n±2 poles, n being equal to 2. It would not be outside the scope of the present invention if n were to be greater than 2.

In the example described, the rotor is an inner rotor, but it would not be outside the scope of the present invention if the rotor were to be an outer rotor, or if the machine were to have both an inner rotor and an outer rotor, each placed radially on either side of the stator and rotationally coupled. Advantageously, the motor satisfies, in accordance with the invention, the relationship $X_d/X_q$.

Control Device

The machine described above with reference to FIG. 1 may be controlled by a control device that allows it to operate at constant power over a wide range of rotation speeds of the rotor, as will be described with reference to FIGS. 2 and 3. This control device is particularly suitable for a machine in which $X_d > X_q$.

Figure 2:
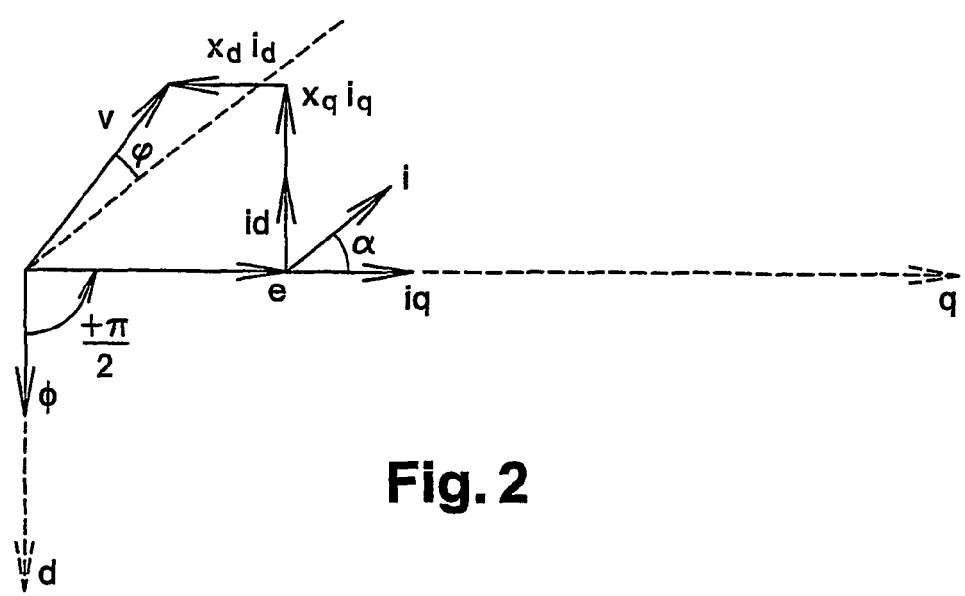
FIG. 2 is a Blondel diagram showing various sinusoidal quantities in a reference frame tied to the electrical angular frequency.
Figure 3:
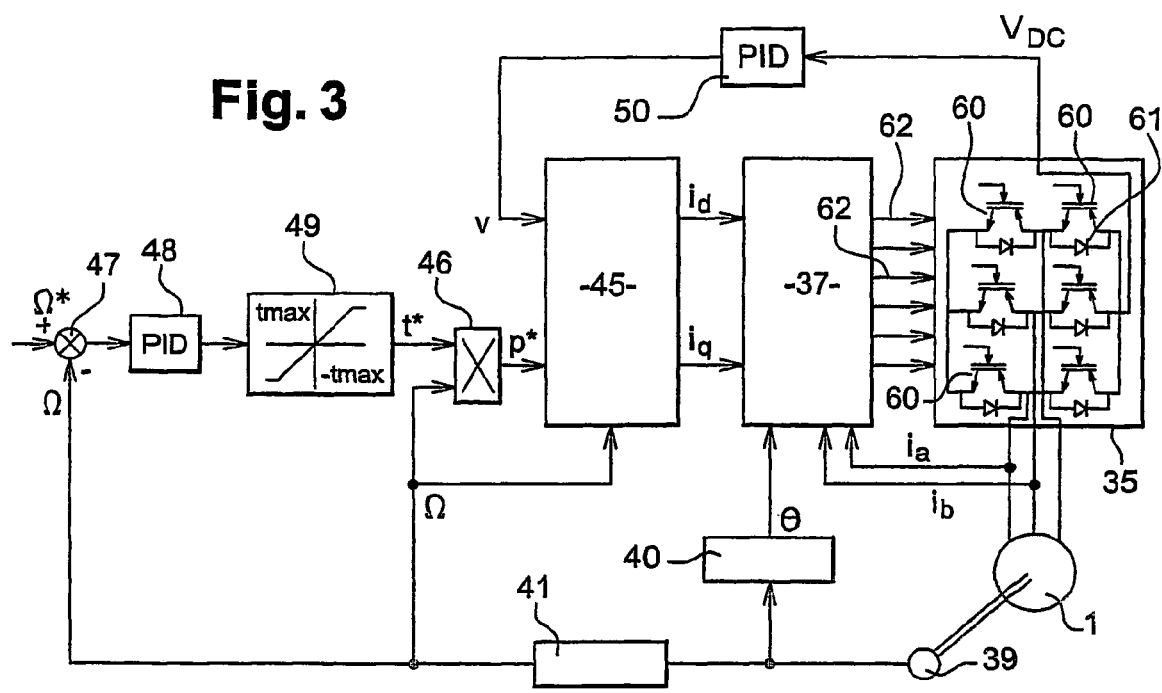
FIG. 3 is a simplified block diagram of a control device for a synchronous motor according to the invention.

For greater clarity, FIG. 2 shows a well-known reference frame tied to the electrical angular frequency ω, having a direct axis d in the same sense and the same direction as the armature flux φ or main flux, which passes through one phase of the armature, and a quadrature axis q shifted through an angle of +π/2 relative to the direct axis d. In the figure, the sinusoidal quantities may be represented by fixed vectors.

In what follows, the unitary values e, $x_d$ and $x_q$ defined above will be used.

The shift of the unitary current i relative to the unitary electromotive force e is chosen so as to keep the voltage constant at speeds above the base speed, since the unitary component $i_d$ of i on the direct axis d will create a flux that opposes the main flux, the total magnetomotive force therefore being reduced and consequently causing a reduction in the induced unitary voltage v, without this unduly impairing the motor torque, the control device being designed so as to allow the machine to operate with the highest possible torque above the base speed. In particular, the purpose of the control device is to allow operation at a power above the base speed substantially equal to the power at the base speed.

The synchronous motor 1 is supplied with a three-phase current coming from an inverter 35 comprising six electronic switches 60, for example one or more IGBTs, each associated with a diode 61 and controlled by six control signals 62 coming from a vector controller 37.

The latter is used to correct the intensity of the current delivered to the motor according to direct current component $i_d$ and quadrature current component $i_q$ setpoints that it receives from a main computer 45, to the measured currents $i_a$ and $i_b$ for two of the three phases, and to an angular position datum $\theta$.

The angular position datum $\theta$ is transmitted by a position calculator 40 connected to a position sensor 39.

The position sensor 39 is also connected to a speed calculator 41.

The value of the rotation speed $\Omega$ calculated by the speed calculator 41 is transmitted to the main computer 45, to a multiplier 46 and to a subtractor 47.

The rotation speed $\Omega$ is subtracted from a rotation speed setpoint $\Omega^*$ of the rotor in the subtractor 47, and then the difference $\Omega^*-\Omega$ is processed by a regulating circuit 48 of the PID (proportional-integral-differential) type and transmitted to a torque calculator 49, which determines a torque setpoint t* according to the difference between the measured rotation speed $\Omega$ and the rotation speed setpoint $\Omega^*$ of the rotor. The torque setpoint t* is limited to the maximum torque $t_{max}$ that the machine is capable of delivering.

The torque setpoint t* is transmitted to the multiplier 46 which calculates a power setpoint p* according to the measured rotation speed $\Omega$ of the rotor.

This power setpoint p* is transmitted to the main computer 45.

Moreover, the voltage $V_{DC}$ across the terminals of the inverter 35 is measured and transmitted to the main computer 45 via a regulating circuit 50 of the PID type in order to smooth out any possible variations. This regulating circuit 50 delivers a unitary voltage v that may vary, being dependent on the mains voltage.

The main computer 45 determines, from the data that it receives, the direct $i_d$ and quadrature $i_q$ current components that correspond to operation at the power p*.

These $i_d$ and $i_q$ values are transmitted to the vector controller 37 and allow it to control, as described above, the inverter 35.

Figure 4:
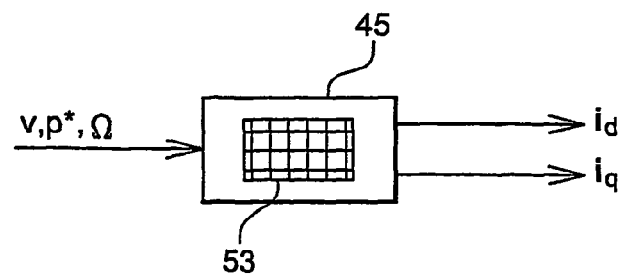
FIG. 4 shows schematically an illustrative example of the main computer of the control device of FIG. 3.

The main computer 45 may determine the $i_d$ and $i_q$ values by access to a register 53 containing precalculated values, as illustrated in FIG. 4. This register 53 contains the $i_d$ and $i_q$ values for a large number of inputs v, p* and $\Omega$. For v, p* and $\Omega$ values, the computer determines the closest values of v, p* and $\Omega$ for which $i_d(v,p^*,\Omega)$ and $i_q(v,p^*,\Omega)$ are known in the register 53.

The main computer 45 may also determine $i_d$ and $i_q$ analytically, by a real-time calculation, using the following formulae:

$$i_d = -1\sin\alpha \text{ and } i_q = i\cos\alpha;$$

$$\alpha = \arctan\left(\frac{x_q(e-y)}{x_d x}\right);$$

$$i = \sqrt{\left(\frac{x}{x_q}\right)^2 + \left(\frac{e-y}{x_d}\right)^2};$$

(x,y) being one of the real roots of the equations:

$$x^2 + y^2 = \frac{v^2}{m^2} \text{ and } y = e\left(1 - \frac{x_d}{x_d - x_q}\right) + \frac{p}{m}e\frac{x_d x_q}{x_d - x_q}\frac{1}{x}.$$

The terms "calculator", "register", "regulating circuit", "subtractor" and "multiplier" must be understood in the broad sense of the words. All these functions may be carried out by one or more specific electronic circuits on one or more electronic cards. These functions may be carried out in hardware and/or software form. In particular, the elements 40, 41, 47, 48, 49, 46, 45, 50 and 37 may be integrated into one and the same electronic card comprising one or more microcontrollers and/or microprocessors.

In the example in question, the defluxing ratio is 6, that is to say the maximum rotation speed of the rotor is six times the base speed, and for example about 1350 revolutions per minute.

Of course, it would not be outside the scope of the present invention if the defluxing ratio were to be different from 6, especially greater than or equal to 2 for example. The electronic switches 60 of the inverter 35 are therefore designed accordingly.

Of course, the invention is not limited to the illustrative example described above. For example, the electrical machine may be produced differently, while still having $X_d > X_q$.

Throughout the description, the expression "having a" must be considered as being synonymous with "having at least one", unless specified to the contrary.

The invention claimed is:

1. A synchronous electrical machine including a motor comprising:
    a stator; and
    at least one rotor having permanent magnets, wherein the motor is configured so as to have $X_d > X_q$, where $X_d$ is the direct reactance and $X_q$ is the quadrature reactance, wherein the rotor is a flux-concentrating rotor, the permanent magnets of the rotor being placed between pole pieces,
    wherein each of the pole pieces of the rotor has a salient part extending toward the stator, having radial edges that are angularly offset relative to the radially directed edges of the permanent magnets adjacent the pole piece.

2. The machine as claimed in claim 1, wherein $X_d/X_q > 1.1$.

3. The machine as claimed in claim 2, wherein $X_d/X_q \approx 3$.

4. The machine as claimed in claim 2, wherein $X_d/X_q > 1.5$.

5. The machine as claimed in claim 1, wherein $X_q I_o/E$ is between 0.33 and 0.6, where $I_o$ denotes the maximum line current intensity imposed by the rating of a controller of the machine and E denotes the electromotive force induced per phase of the machine.

6. The machine as claimed claim 1, wherein $X_d I_o/E$ is between 0.66 and 1, where $I_o$ denotes the maximum line current intensity imposed by the rating of a controller of the machine and E denotes the electromotive force induced per phase of the machine.

7. The machine as claimed in claim 1, wherein the pole pieces of the rotor each have a face turned toward the stator, which face has a convex portion.

8. The machine as claimed in claim 1, wherein each of the permanent magnets of the rotor lies radially set back from the circumferential ends of the convex portions of the two adjacent pole pieces.

9. The machine as claimed in claim 8, wherein the setback (r) in the radial direction of the magnets relative to the circumferential ends of the convex portions lies between 10% and 20% of the inside radius (R) of the stator.

10. The machine as claimed in claim 1, wherein each of the pole pieces of the rotor has two shoulders, at least one permanent magnet lying between the shoulders of two adjacent pole pieces.

11. The machine as claimed in claim 1, wherein the permanent magnets have, when the machine is observed along the axis (X) of rotation of the rotor, a cross section of elongate shape with its long axis lying in a radial direction.

12. The machine as claimed in claim 1, wherein the permanent magnets of the rotor have, when the machine is observed along the axis (X) of rotation of the rotor, a rectangular cross section with its large side oriented parallel to a radius of the machine.

13. The machine as claimed in claim 1, wherein the stator has 6n teeth and the rotor has 6n±2 poles, n being greater than or equal to 2.

14. The machine as claimed in claim 1, wherein the machine has a single inner rotor.

15. The machine as claimed in claim 1, wherein the power of the machine is equal to or greater than 0.5 kW.

16. The machine as claimed in claim 1, wherein the machine constitutes a generator.

17. The machine as claimed in claim 1, wherein the machine constitutes a motor.

18. A synchronous electrical machine including a motor comprising:

a stator; and at least one rotor having permanent magnets, wherein the motor is configured so as to have $X_d > X_q$, where $X_d$ is the direct reactance and $X_q$ is the quadrature reactance, wherein the rotor is a flux-concentrating rotor, the permanent magnets of the rotor being placed between pole pieces, wherein the pole pieces of the rotor each have a face turned toward the stator, which face has a convex portion, wherein the convex portion of at least one of the pole pieces has a radius of curvature of between 20% and 30% of the inside radius (R) of the stator, and wherein the circumferential ends of the convex portion of the one pole piece are angularly offset relative to the permanent magnets adjacent the one pole piece.

19. The machine as claimed in claim 18, wherein the angular offset β of the circumferential ends relative to the adjacent permanent magnets lies:

between $80°/n_{teeth}$ and $100°/n_{teeth}$, being especially about $90°/n_{teeth}$, for a machine in which the ratio of the number of stator teeth $n_{teeth}$ to the number of rotor poles $n_{poles}$ is 3/2 or which satisfies the relationship $n_{teeth}/n_{poles}=6n/(6n-2)$, where n is an integer greater than or equal to 2; and between $50°/n_{teeth}$ and $70°/n_{teeth}$, being especially about $60°/n_{teeth}$, for a machine that satisfies the relationship $n_{teeth}/n_{poles}=6n/(6n+2)$, where n is an integer greater than or equal to 2.

* * * * *